(12) United States Patent
Krueger

(10) Patent No.: US 9,434,014 B1
(45) Date of Patent: Sep. 6, 2016

(54) FIELD-PORTABLE HOLE BROACHING MACHINES AND METHODS FOR USING THE SAME

(71) Applicant: BNSF Railway Company, Fort Worth, TX (US)

(72) Inventor: Darrell Robert Krueger, Lawrence, KS (US)

(73) Assignee: BNSF Railway Company, Fort Worth, TX (US)

( * ) Notice: Subject to any disclaimer, the term of this patent is extended or adjusted under 35 U.S.C. 154(b) by 289 days.

(21) Appl. No.: 14/336,594

(22) Filed: Jul. 21, 2014

Related U.S. Application Data

(60) Provisional application No. 61/892,732, filed on Oct. 18, 2013.

(51) Int. Cl.
| | | |
|---|---|---|
| *B23D 41/04* | (2006.01) | |
| *B23D 43/02* | (2006.01) | |
| *B23D 41/08* | (2006.01) | |
| *B23D 37/22* | (2006.01) | |
| *E01B 31/06* | (2006.01) | |
| *B23D 37/04* | (2006.01) | |
| *B23D 37/02* | (2006.01) | |
| *B23D 37/08* | (2006.01) | |
| *B23D 37/10* | (2006.01) | |

(Continued)

(52) U.S. Cl.
CPC .............. *B23D 43/02* (2013.01); *B23D 37/22* (2013.01); *B23D 41/08* (2013.01); *E01B 31/06* (2013.01); *B23D 37/02* (2013.01); *B23D 37/04* (2013.01); *B23D 37/08* (2013.01); *B23D 37/10* (2013.01); *B23D 41/02* (2013.01); *B23D 41/06* (2013.01); *Y10T 409/4063* (2015.01); *Y10T 409/400175* (2015.01); *Y10T 409/40595* (2015.01); *Y10T 409/40665* (2015.01); *Y10T 409/406475* (2015.01)

(58) Field of Classification Search
CPC ...... B23D 37/02; B23D 37/04; B23D 37/08; B23D 37/10; B23D 37/22; B23D 41/02; B23D 41/06; B23D 41/08; Y10T 409/400175; Y10T 409/4028; Y10T 409/405775; Y10T 409/40595; Y10T 409/4063; Y10T 409/40735; Y10T 409/40665; Y10T 409/406475; Y10T 409/4077

See application file for complete search history.

(56) References Cited

U.S. PATENT DOCUMENTS

| | | | | |
|---|---|---|---|---|
| 286,298 | A * | 10/1883 | Hart ...................... | B23B 35/005 408/101 |
| 1,421,194 | A * | 6/1922 | Everett .................. | E01B 31/06 408/78 |

(Continued)

*Primary Examiner* — Daniel Howell
*Assistant Examiner* — Yasir Diab
(74) *Attorney, Agent, or Firm* — Thompson & Knight LLP; James J. Murphy

(57) ABSTRACT

A broaching machine includes a support structure, a pulling head for releasably coupling to an end of a broach, and an acme screw coupled to the pulling head for linearly moving the pulling head along a portion of the support structure. A gearbox assembly is supported by the support structure and is coupled to the acme screw for translating an applied rotational forced into linear motion of the acme screw and the pulling head. A first adapter plate is supported by the support structure for mating with a compatible second adapter plate coupled to a railroad rail. The first adapter plate includes an aperture allowing a broach coupled to the pulling head to linearly travel through a pilot hole formed through the railroad rail in response to the applied rotational force and responsive linear motion of the acme screw and the pulling head.

22 Claims, 16 Drawing Sheets

(51) Int. Cl.
*B23D 41/06* (2006.01)
*B23D 41/02* (2006.01)

(56) References Cited

U.S. PATENT DOCUMENTS

| | | | | | |
|---|---|---|---|---|---|
| 2,013,899 | A | * | 9/1935 | Roco | B23D 43/06 407/12 |
| 2,114,276 | A | * | 4/1938 | Baumbach | B23D 37/04 409/264 |
| 2,392,747 | A | * | 1/1946 | Lapointe | B23D 41/04 279/79 |
| 2,814,238 | A | * | 11/1957 | Schupner | B23D 37/04 407/13 |
| 4,753,556 | A | * | 6/1988 | Solko | B23Q 9/0014 408/108 |
| 5,489,169 | A | * | 2/1996 | Scott | B23D 37/10 409/244 |
| 5,615,467 | A | * | 4/1997 | Simmons | B23D 37/04 29/27 C |
| 5,632,577 | A | * | 5/1997 | Peroni | B23B 41/003 408/103 |
| 5,938,378 | A | * | 8/1999 | Omi | B23B 41/00 408/103 |
| 6,132,151 | A | * | 10/2000 | Courmier | B23D 37/10 409/259 |
| 2003/0086765 | A1 | * | 5/2003 | Nolan | B23D 37/22 407/13 |

* cited by examiner

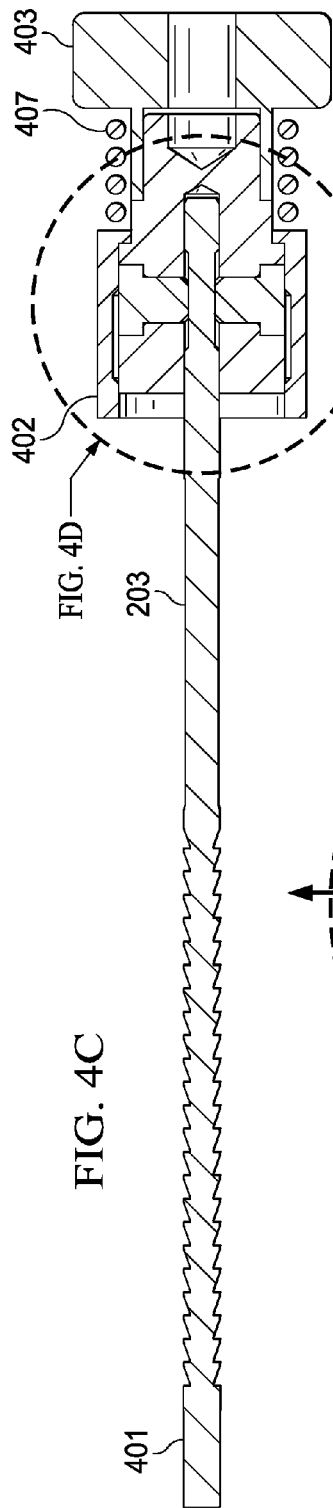
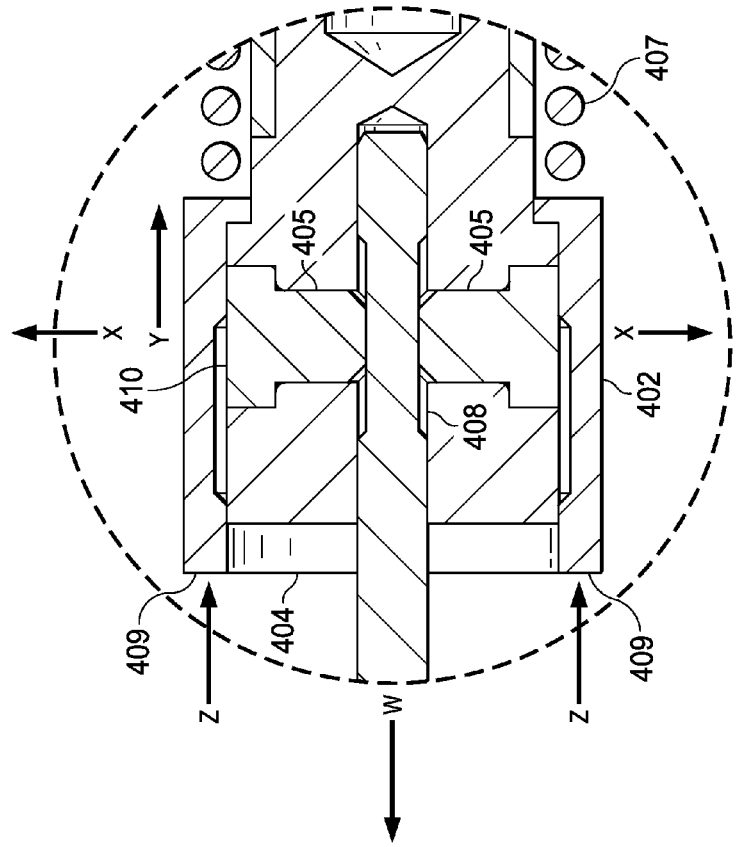
FIG. 4C
FIG. 4D

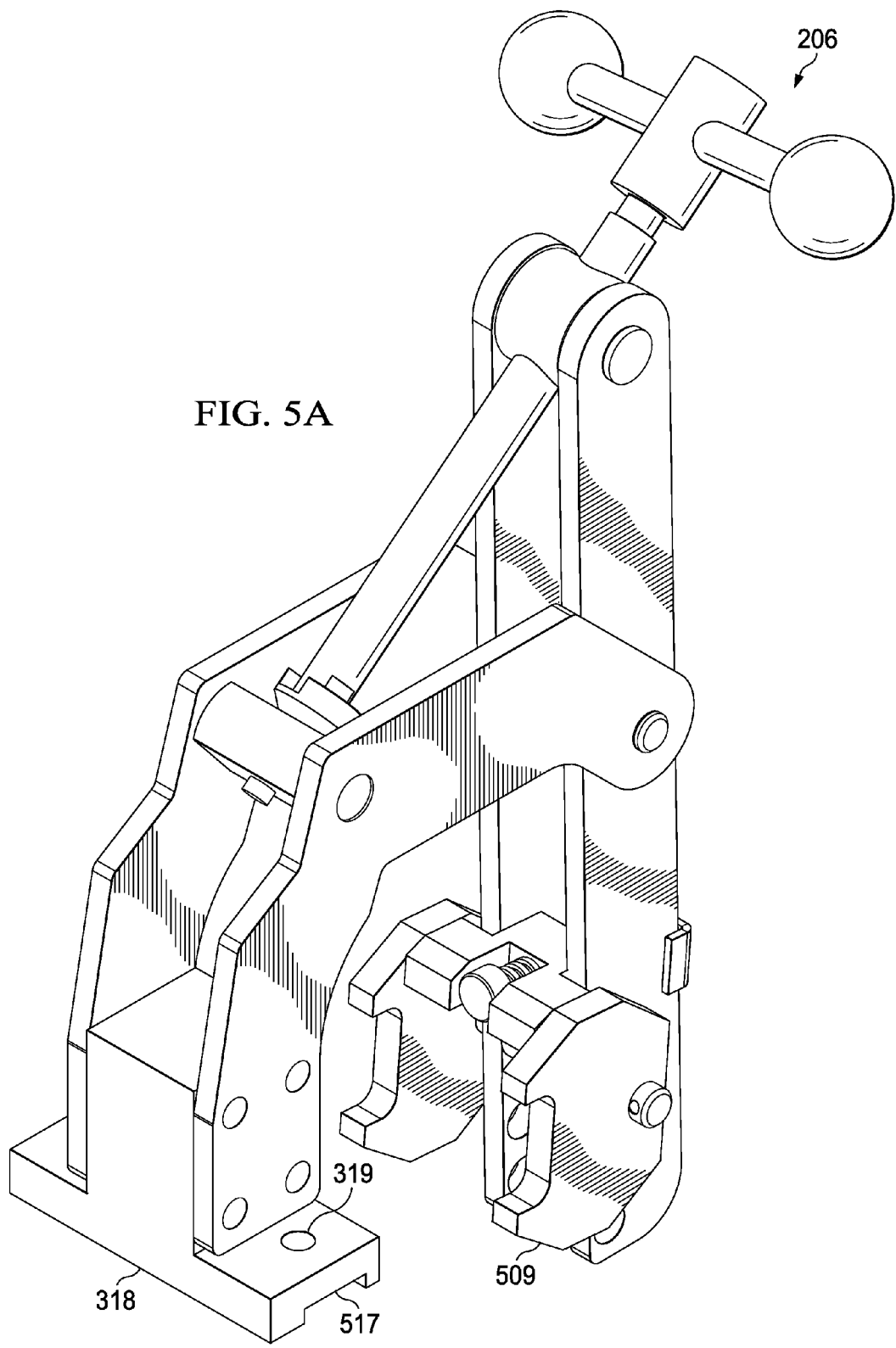

FIELD-PORTABLE HOLE BROACHING MACHINES AND METHODS FOR USING THE SAME

CROSS-REFERENCE TO RELATED APPLICATION

The present application claims the benefit of U.S. Provisional Application Ser. No. 61/892,732, filed Oct. 18, 2013.

FIELD OF INVENTION

The present invention relates in general to broaching techniques, and in particular to field-portable hole broaching machines and methods of their use.

BACKGROUND OF INVENTION

A railroad must often gather operational data, such as axle count, train weight, rail neutral temperature, rail longitudinal stress and number of wheel impacts on a particular section of track. One particular data gathering technique is to bore one or more holes into the web of a section of rail and insert a corresponding number of sensors. In order to ensure sensor measurement accuracy, these sensors must be inserted into the corresponding holes in the rail web with a "strong press fit" (e.g., a fit categorized in ISO Class H7/s6). However, existing techniques for creating holes through a rail web have not produced holes with the accurate diameters and smooth inner surfaces required for the strong press fit needed to ensure sensor accuracy.

SUMMARY OF INVENTION

One representative embodiment of the principles of the present invention is broaching machine, which includes a support structure, a pulling head for releasably engaging an end of a broach, and an acme screw engaging the pulling head for linearly moving the pulling head along a portion of the support structure. A gearbox assembly is also supported by the support structure and engages with the acme screw for translating an applied rotational force into linear motion of the acme screw and the pulling head. A first adapter plate, supported by the support structure, mates with a compatible second adapter plate clamped to a railroad rail. The first adapter plate includes an aperture allowing a broach coupled to the pulling head to linearly travel through a pilot hole formed through the railroad rail in response to the applied rotational force and resulting linear motion of the acme screw and the pulling head.

Embodiments of the present principles advantageously provide for a broaching machine that is light, compact, and therefore portable. While the disclosed broaching machine is not limited to use in railroad applications, it is particularly useful for forming holes through the web of a railroad rail, such as those required for strong press fitting of rail sensors. In addition, a winged configuration of the adapter plates allows for sufficient clearance from the track fasteners. Moreover, the preferred embodiments use industry standard rail clamps and rail shoes to mount the broaching machine to the rail during broaching operations, as well as for mounting a drill during pilot hole drilling.

Furthermore, since the broaching machine is entirely mechanical, the hydraulic actuators normally found in typical broaching machines are eliminated, which allows the broaching machine to be actuated in the field either manually (e.g., with a ratchet and socket) or by conventional battery-powered portable tools. Finally, alignment pins and corresponding alignment bushings on the quick disconnect adapter plates ensure accurate hole creation, not only during broaching, but also during the drilling of the initial pilot hole.

BRIEF DESCRIPTION OF DRAWINGS

For a more complete understanding of the present invention, and the advantages thereof, reference is now made to the following descriptions taken in conjunction with the accompanying drawings, in which:

FIG. 4C is a cutaway view of the assembly including the puller head assembly and engaged broach shown in FIG. 3;

FIG. 4D is a more detailed cutaway view of engagement between the puller head assembly and the broach shown in FIG. 4C.

FIGS. 5A and 5B are respective perspective and exploded views of the rail clamp assembly shown in FIGS. 2A-2D and 3;

DETAILED DESCRIPTION OF THE INVENTION

The principles of the present invention and their advantages are best understood by referring to the illustrated embodiment depicted in FIGS. 1-7 of the drawings, in which like numbers designate like parts.

Figure 1:
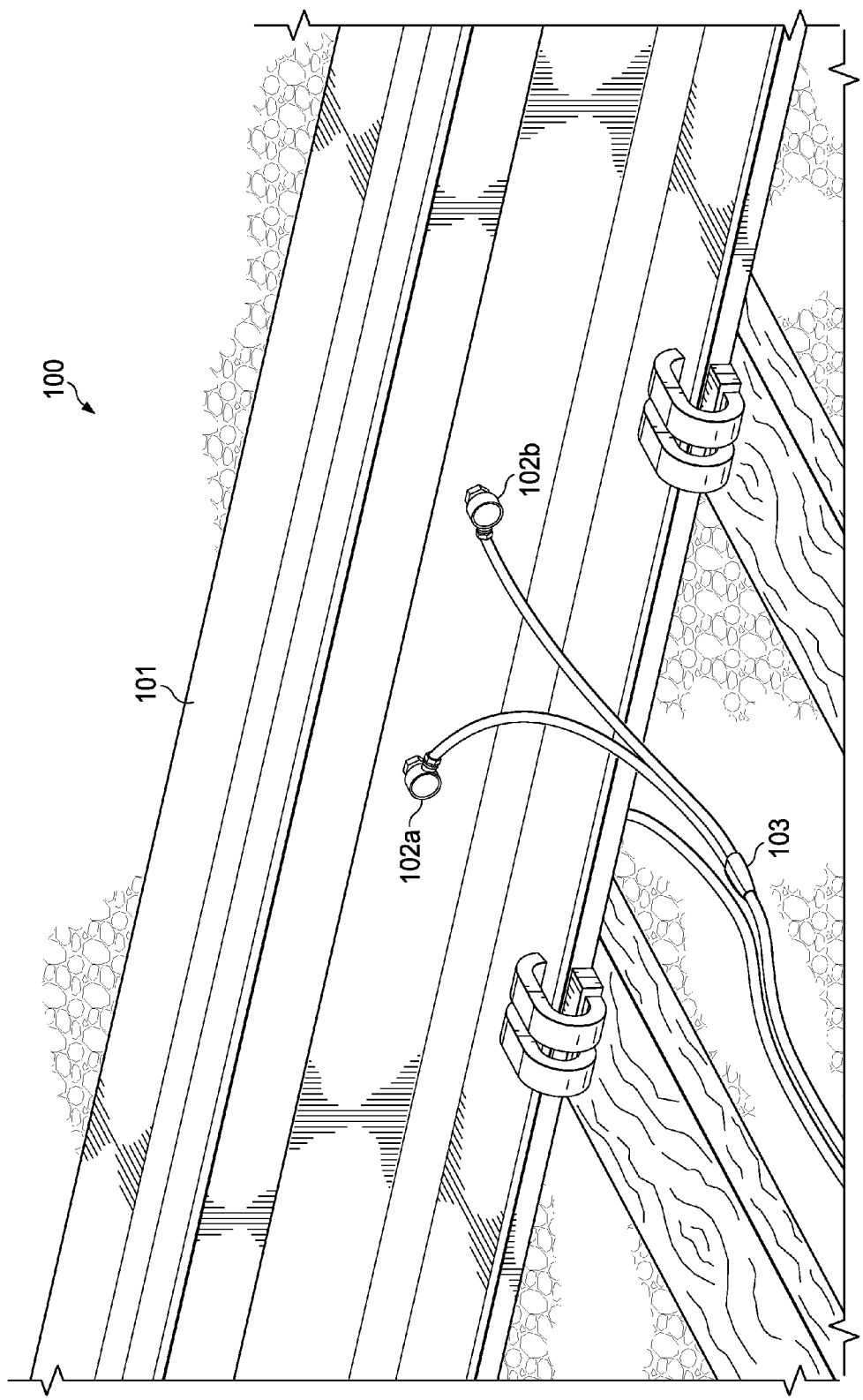
FIG. 1 shows a small section of a railroad rail with attached sensors suitable for describing an exemplary application of the principles of the present invention.

FIG. 1 is a diagram of a sensing system 100 suitable for describing a representative application of the principles of the present invention. In FIG. 1, a small portion of a typical section of railroad rail 101 is shown for reference. A pair of spaced-apart sensors 102a and 102b have been strong press fit into corresponding holes in the web portion of rail section 101. A pair of electrical leads 103 transmit data from sensors 102a and 102b to associated measurement equipment (not shown).

In one embodiment of the present principles, sensors 102a-102b are Vortok MultiSensors, available from Vortok International Innovation House, Plymouth, United Kingdom, although the present principles are equally applicable sensors of other types and from other manufacturers. Generally, sensors 102a-102b measure the vertical and horizontal forces applied to rail section 101 through the wheels of locomotives, railcars, and other rail-compatible vehicles, vertical and lateral acceleration, and rail core temperature. From these data, operational parameters such as axle count, train weight, rail neutral temperature, rail longitudinal stress, and number of wheel impacts can be calculated.

One common approach to forming holes in a standard rail web for mounting sensors 102a-102b is to drill a pilot hole through the rail web and then ream the pilot hole until the proper diameter, typically 10 mm, is reached. The inventor has found, however, that this approach normally will not result in holes having the sufficiently accurate diameter and smooth inner surface needed to achieve the required strong press fit.

According to the principles of the present invention, holes providing the necessary strong press fit are formed by first drilling a pilot hole through the web of rail section 101. A broach is then pulled through the pilot hole to accurately increase the diameter of the pilot hole and provide a smooth inner surface.

A broach is a known form of cutting tool, which normally used for removing material (e.g., metal or plastic) to shape an outer surface of an object or a hole. Typically, a linear motion is applied to a broach, which carries a set of teeth similar to a saw, using specialized broaching equipment. Conventional broaching equipment is normally large and heavy and therefore usually limited to in-shop use. Among other things, conventional shop-based broaching machines are designed to accommodate many sizes of broaches, which results in substantial weight and size beyond those acceptable for a man-portable system. In addition, many conventional broaching machines are hydraulically driven, which further limits their suitability to in-shop use.

The principles of the present invention therefore provide for a field portable broaching machine suitable for use in field applications such as forming holes through the web of a railroad rail with sufficient tolerances to allow for a strong press fit of a corresponding sensor. One such field broaching machine 200 is shown in assembled form in FIGS. 2A-2B, as fastened to exemplary rail section 101.

Figure 2A:
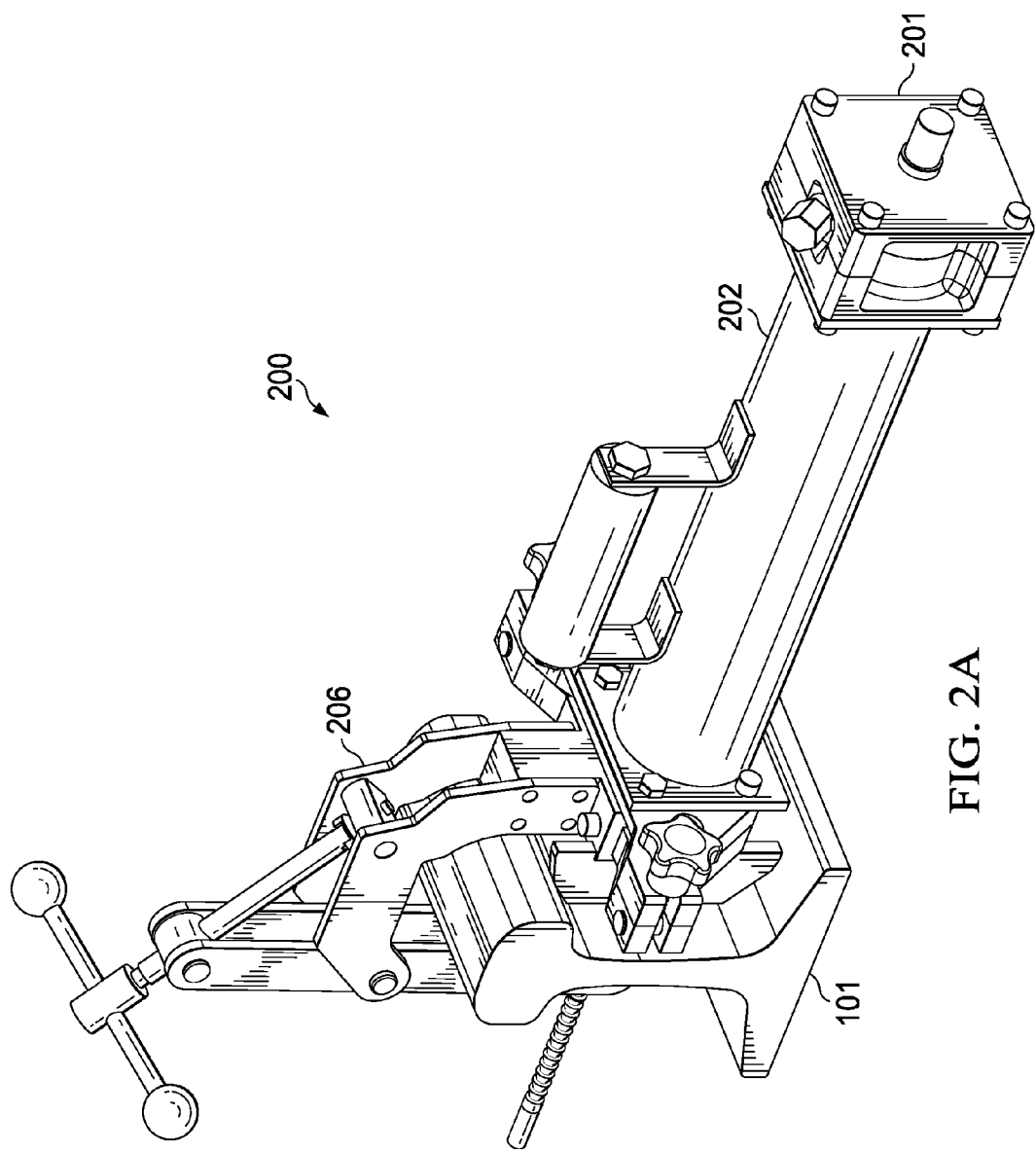
FIGS. 2A-2D are respective perspective, top plan, side elevational, and end elevational views of a field-portable hole broaching machine embodying the principles of the present invention, as attached to a small section of railroad rail.
Figure 2B:
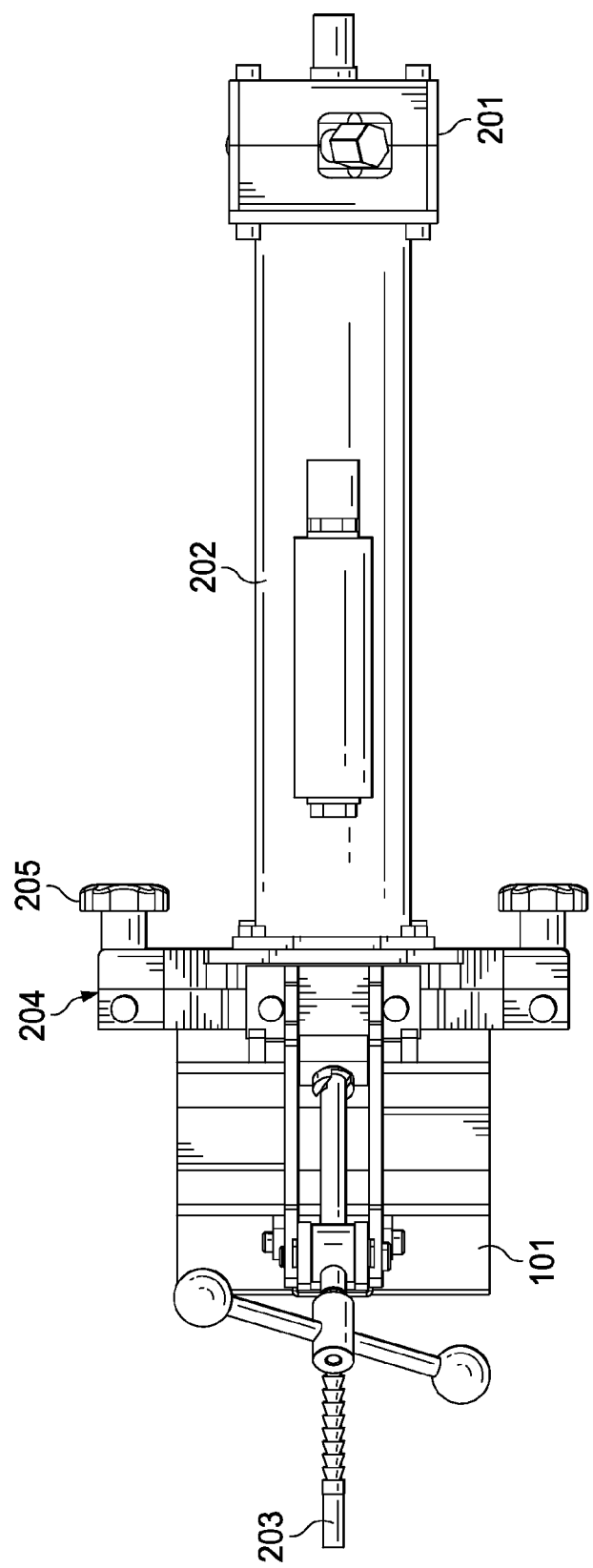
Figure 2C:
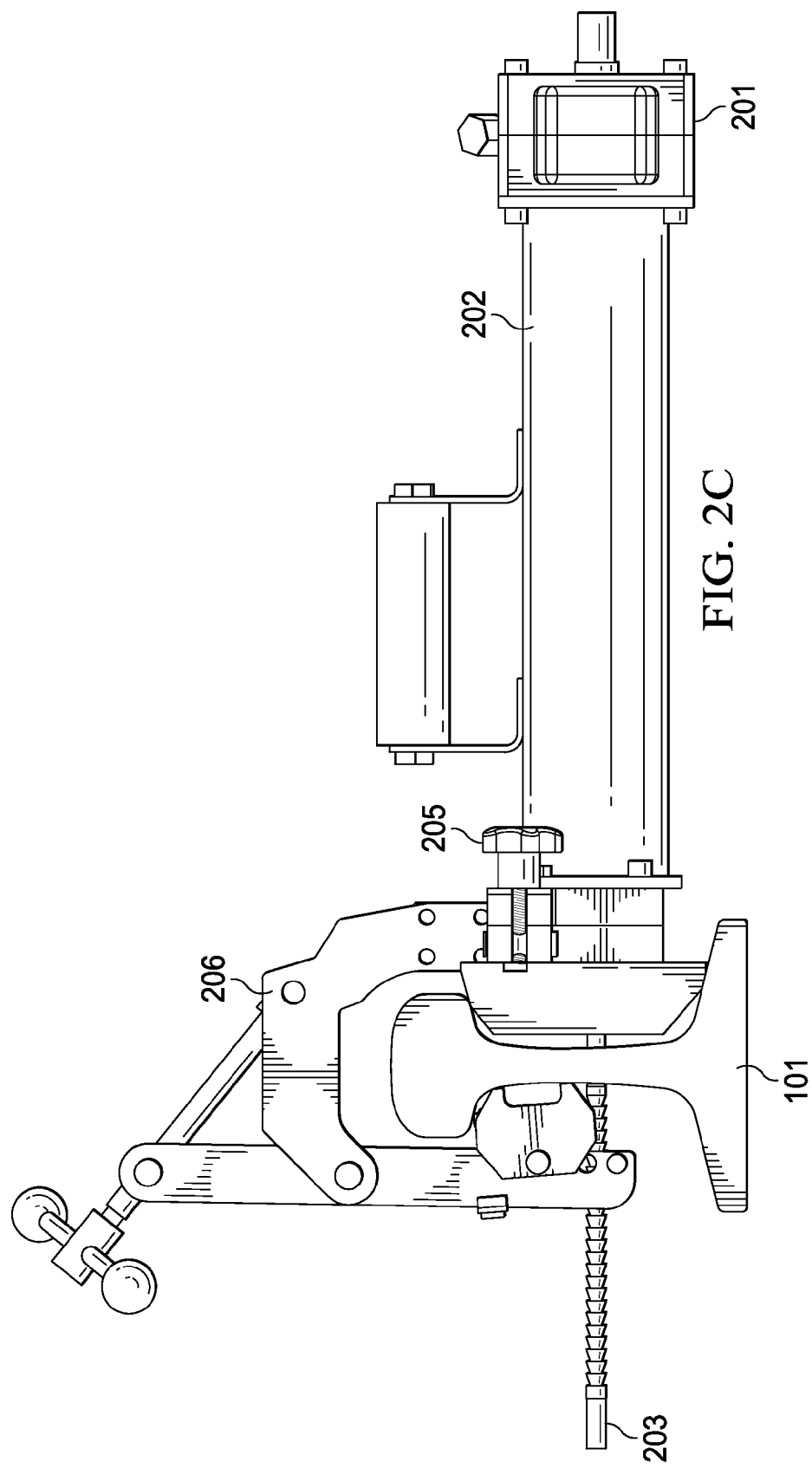
Figure 2D:
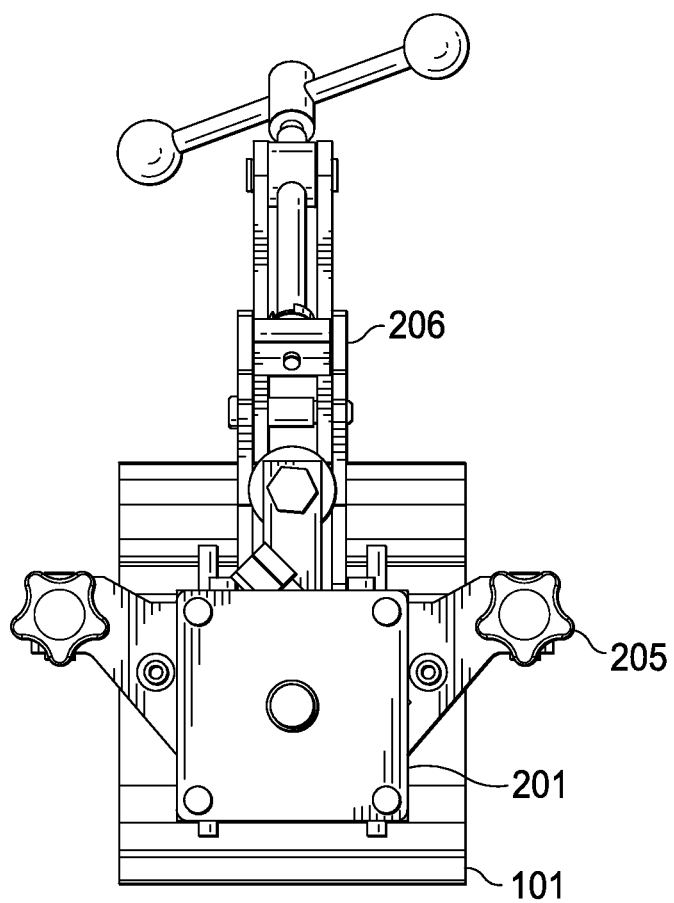

As shown in FIGS. 2A-2B, field broaching machine 200 includes a gear box/interface assembly 201, which advantageously can be manually actuated (e.g., by a ratchet or socket) or by a powered driver (e.g., a battery powered tool). Field broaching machine 200 also includes broach tube assembly 202, broach 203, quick release adapter plate assembly 204, adapter plate release knobs 205, and rail clamp assembly 206.

Figure 3:
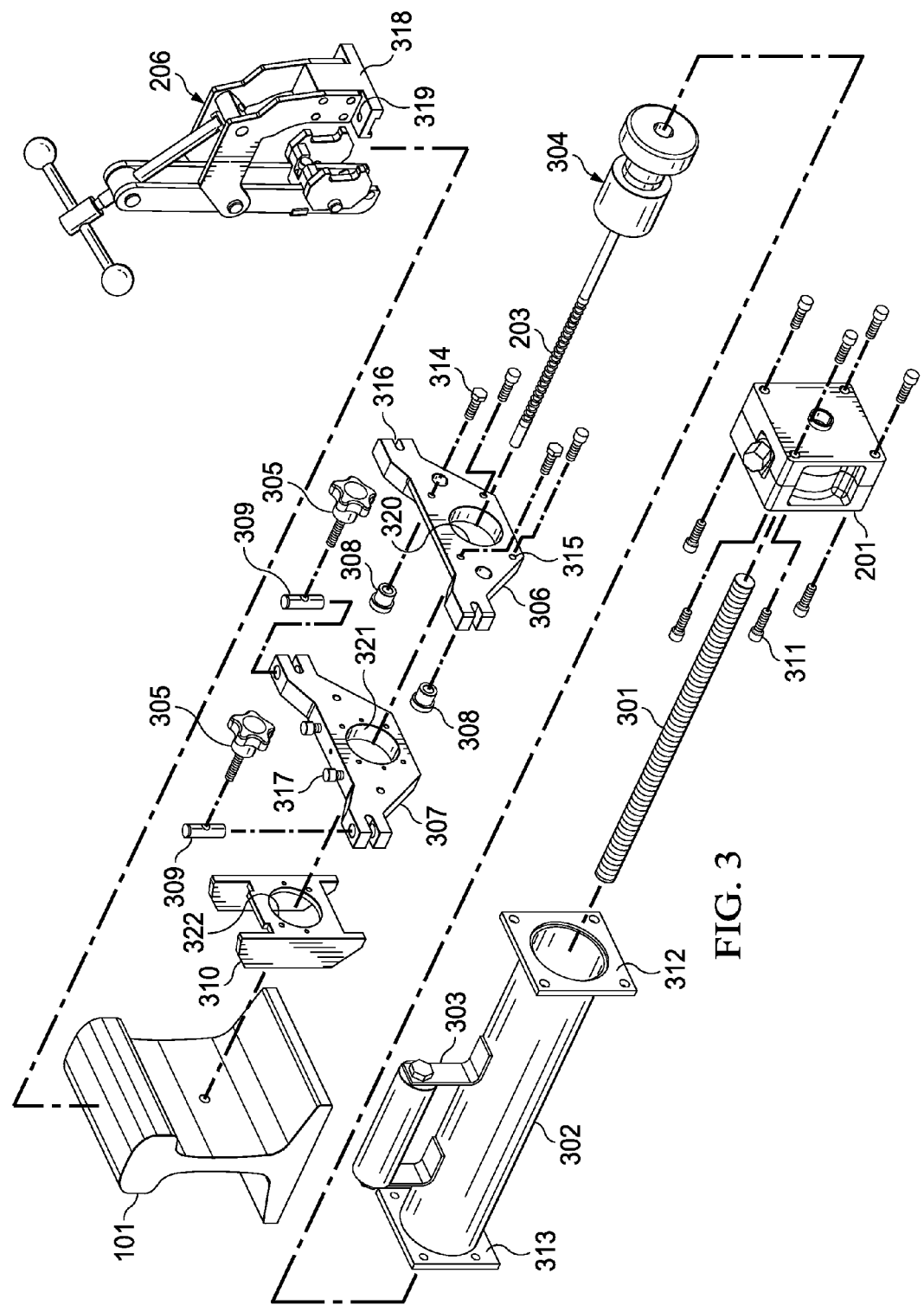
FIG. 3 is an exploded view of the field-portable hole broaching machine of FIGS. 2A-2D.

FIG. 3 is an exploded view of the overall assembly of field broaching machine 200. Gearbox assembly 201 couples to an acme screw 301, which in turn moves axially through broach tube weldment 302 of broach tube assembly 202. Broach tube assembly 202 further includes a carrying handle 303 allowing for easier transport and handling of field broaching machine 200 in the field. A set of threaded fasteners 311 attach gearbox assembly 201 to a first flange 312 affixed to broach tube weldment 302 in the illustrated embodiment.

The distal end of acme screw 301 couples to a broach puller head assembly 304, which moves along the axis of broach tube weldment 303 in response to the linear (axial) movement of acme screw 301. Broach puller assembly 305 also releasably couples to a first end of broach 203, as discussed further below. Broach 203 travels through apertures 320, 321, and 322 respectively defined through broach adapter plate 306, rail adapter plate 307, and rail shoe 310. In the illustrated embodiment, a second flange 313 affixed broach weldment 302 attaches to broach adapter plate 306 with a set of threaded fasteners 314 mating with broach adapter plate threaded holes 315.

Figure 7A:
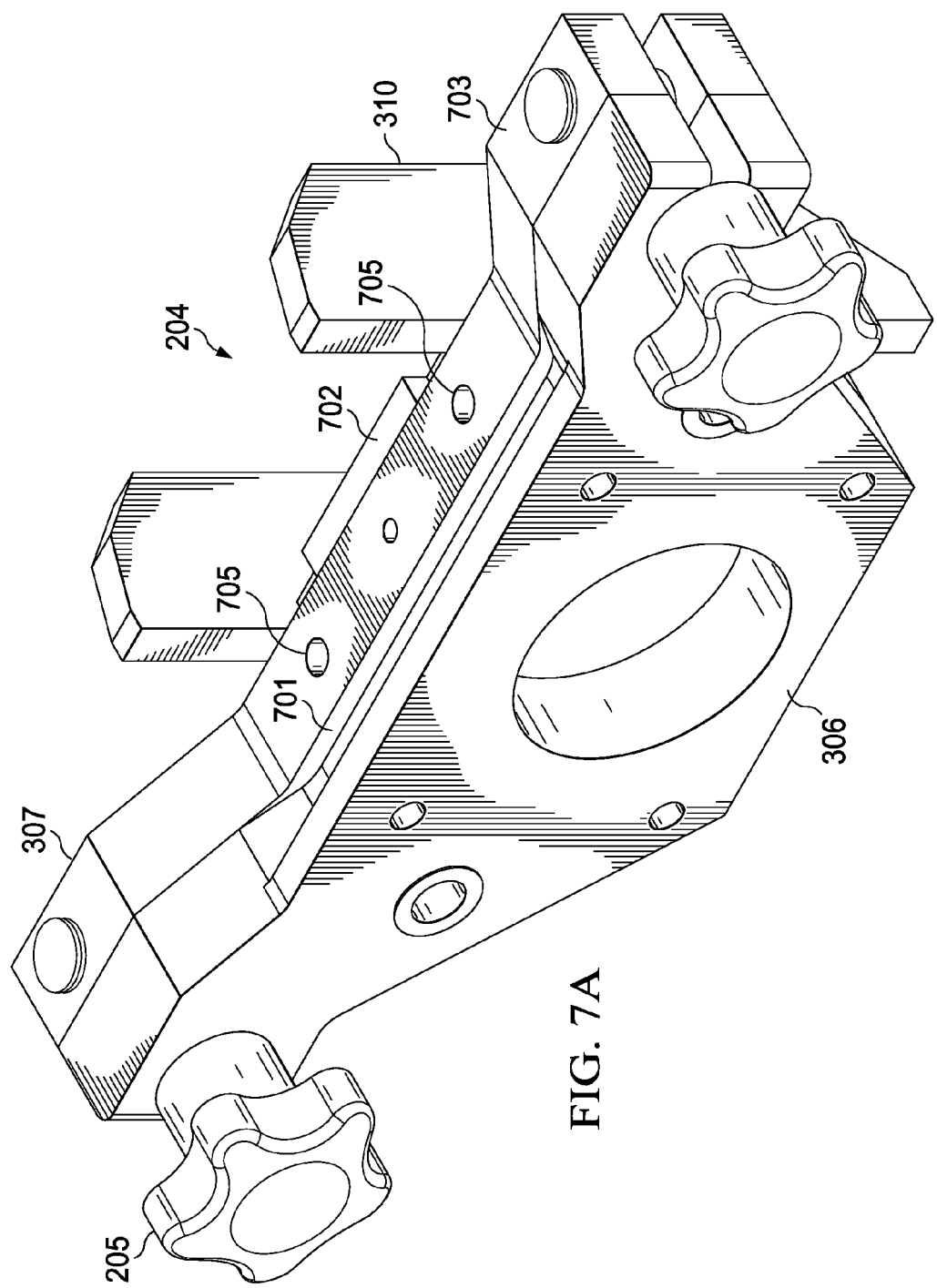
FIGS. 7A and 7B are respective perspective and exploded views of the adapter plate and rail shoe assembly of FIGS. 2A-2D and 3.
Figure 7B:
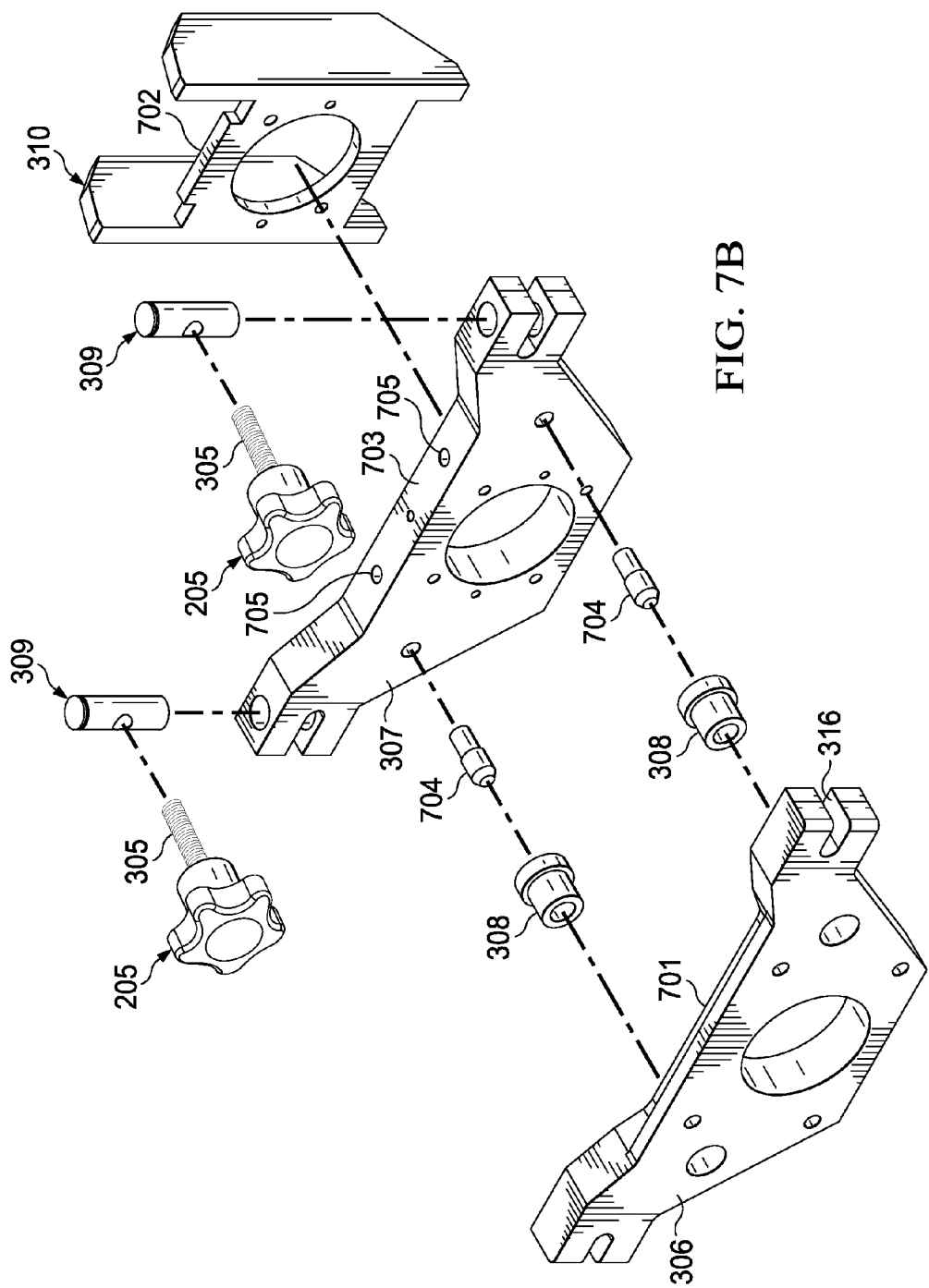

Alignment bushings 308 on broach adapter plate 306 align with alignment pins on rail adapter plate 307 (see FIG. 7B). The ends of adapter plate fasteners 305, which form a fastening assembly with adapter plate release knobs 205, thread into threaded holes through swivel pins 309 carried on the wings of rail adapter plate 307. When loosened, broach adapter plate fasteners 305 and adapter plate release knobs 205 swivel into and out of slots 316 on the corresponding wings of broach adapter plate 306, allowing broach adapter plate 306 and rail adapter plate 307 to be a mated and separated. Rail shoe 310, which is sized according to the dimensions of the web of the particular rail section 101, is attached to the opposite side of rail adapter plate 307 by screws or similar fasteners (not shown for clarity).

A pair of threaded fasteners 317 extend through pair of apertures 319 through clamp block 318 on rail clamp assembly 206 and thread into a corresponding pair of threaded holes in the upper surface of rail adapter plate 307 (FIGS. 7A and 7B). Consequently, clamp block 318 can be fastened to rail adapter plate 307 to form a complete assembly including rail clamp assembly 206, rail adapter plate 307, and rail shoe 310.

Figure 4A:
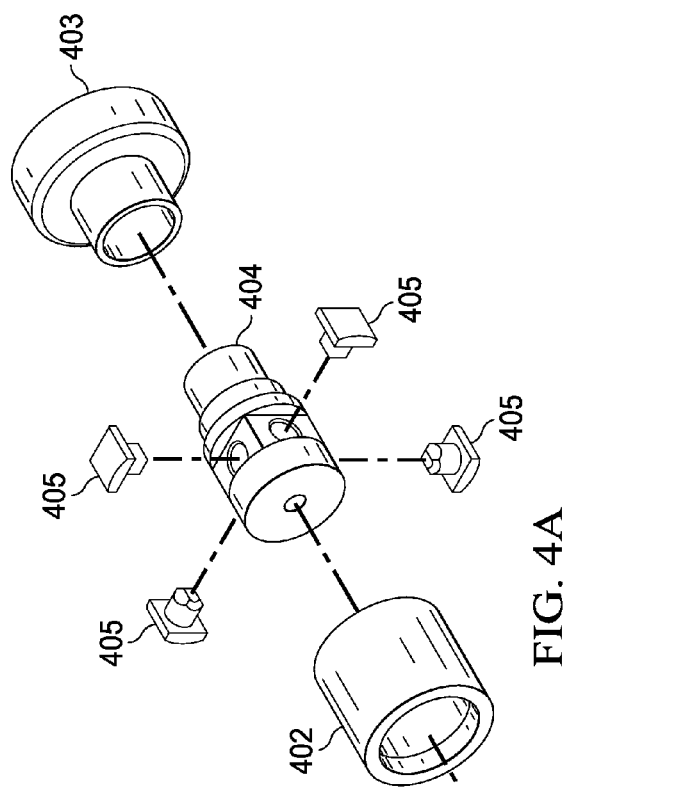
FIG. 4A is a more detailed exploded view of the broach puller head assembly shown in FIG. 3.
Figure 4B:
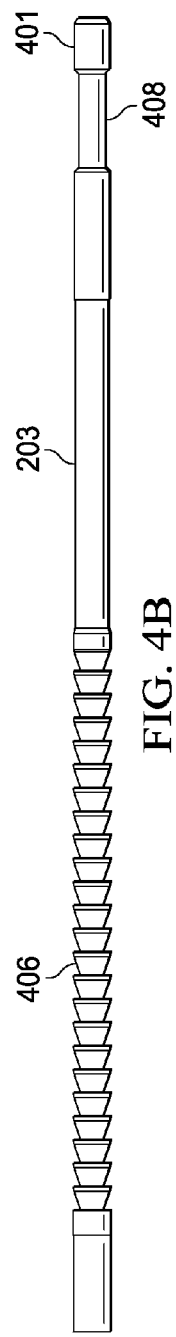
FIG. 4B is a more detailed plan view of the broach shown in FIGS. 2A-2D, 3, and 4A.

FIGS. 4A and 4B provide more detailed views of broach puller head assembly 304 and broach 203. Broach puller assembly 304 includes a broach puller sleeve 402 and a coupling/fusible link 403, which couples to acme screw 301 (FIG. 3). A first end 401 of broach 203 is received within the bore of a broach body 404 and held in place by a set of broach jaws 405 when sleeve 402 is in the locked position, as discussed further below. In the locked section, sleeve 402 extends over broach body 404 and is biased against the inner endwall of fusible link 403 by a coil spring 407 (FIGS. 4C and 4D.

FIG. 4B shows a preferred pull broach embodiment of broach 203. In this embodiment, broach 203 is generally round and includes a set of chisel points (teeth) 406 for removing material along the inner surface of a pilot hole. A locking notch 408 is dimensioned to engage broach jaws 405 when in the locked position 203 is a Dumont Company R-9735 10 mm broach having 25 teeth and variable pitch.

FIGS. 4C and 4D are detailed cutaway views of puller head assembly 304 and its engagement with broach 203. When surface 409 of sleeve 402 is pressed with a sufficient force Z against the surface of broach adapter plate 306 around the periphery of aperture 320), sleeve 402 retracts in the Y-direction against the bias of spring 407. When the travel of sleeve 402 is sufficient, jaws 405 align with annular recess 410 disposed within the bore of sleeve 402, which releases jaws 405 and allows them to travel radially outward in the X-direction. When the user pulls broach 203 in the W-direction, jaws 405 move radially outward into annular recess 410 on sleeve 402 and out of locking notch 408 on broach 203 (i.e., jaws 405 are now unlocked). Broach 203 can now be extracted or inserted into the bore of body 404.

When the force is released from surface 409 of sleeve 402, spring 407 forces sleeve in the opposite Y-direction. Jaws 405 are forced out of recess 410 in the opposite X-direction and into locking notch 408 of any broach 203 received within puller head body 404. Jaws 405 are now in the locked position and the engaged broach 203 is ready for use.

Figure 5B:
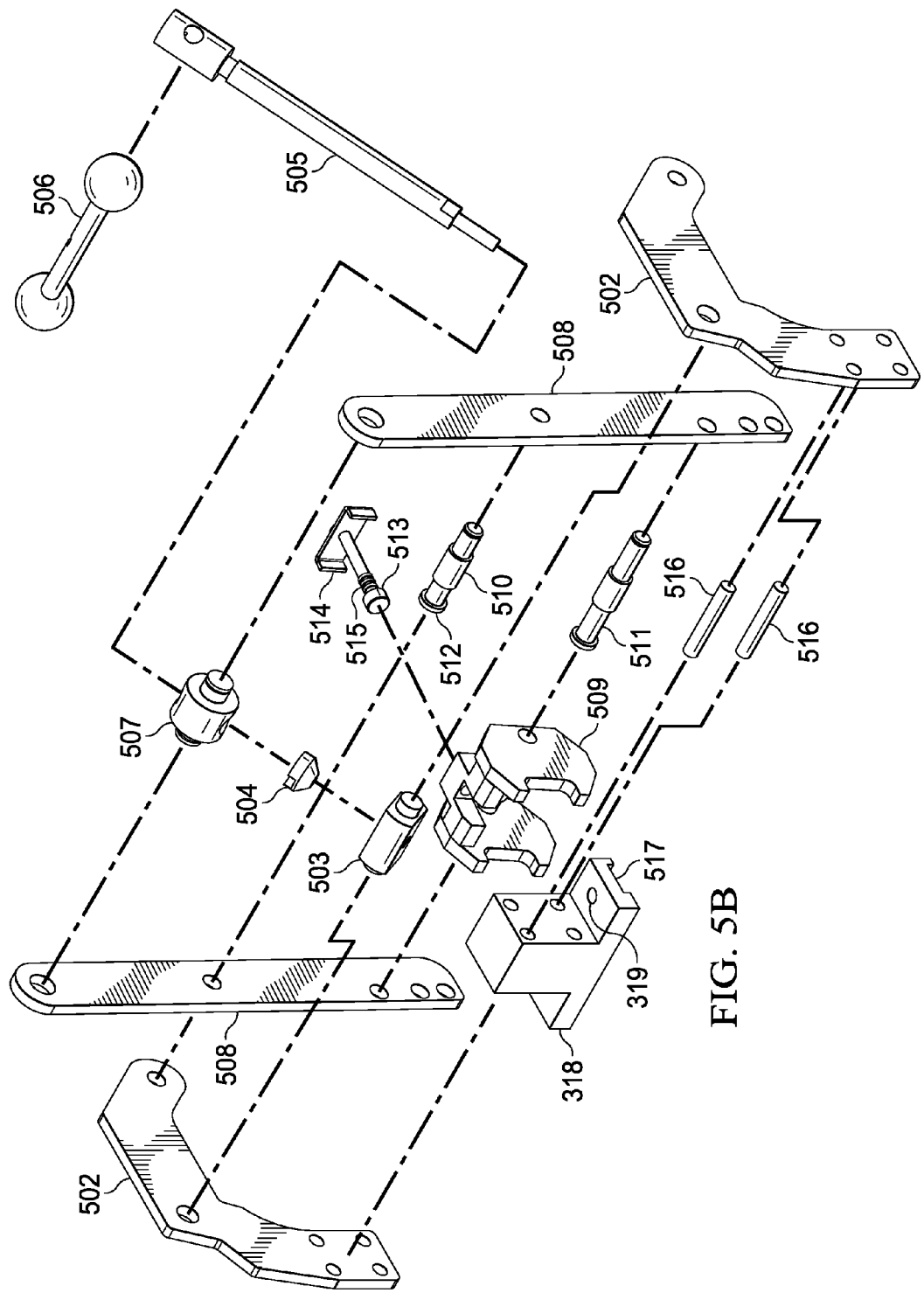

Rail clamp assembly 206 of FIGS. 2A-2D and 3 is shown in more detail in FIG. 5A. An exploded view is shown in FIG. 5B. In the preferred embodiment of field broaching machine 200, rail clamp assembly 206 is a standard, commercially available, rail clamp. For clarity, the conventional fasteners are not shown.

Rail clamp assembly 206 includes clamp block 318, which has a pair of apertures 319 for receiving fasteners 317 for attaching rail clamp 204 to the upper surface of rail adapter plate 307, as discussed above in conjunction with FIG. 3. A pair of generally parallel arches 502 are affixed to clamp block 318 by a set of four pins 516, two of which are shown for reference. A thrust lug 503 is affixed between corresponding apertures on arches 502. An aperture in thrust lug 503 receives a thrust cap 504 and the end of an acme screw 505, which is in turn connected to an acme screw handle 506.

Acme screw 505 also extends through an acme nut 507 having ends that are affixed in the corresponding ends of a pair of generally parallel lever arms 508. A pivot spacer 510 and lever arm pivot pin 512 couple the second ends of arches 502 and intervening lever arms 508. The opposing ends of lever arms 508 are pivotally coupled to a clamp assembly 509 with a pivot pin 511. Clamp assembly 509 is biased against lever arms 508 by tension pin 513, tension bridge 514, and tension spring 515. A receptacle 517 defined by extensions on clamp block 318 is dimensioned to receive a portion of the upper surface of rail adapter 307, as discussed further below.

In operation, rotation of handle 506 causes acme nut 507 to travel up or down acme screw 507, depending on the direction of handle rotation. In turn, lever arms 508 pivot around pivot pin 512 thereby increasing or decreasing the spacing between clamp block 318 and clamp assembly 509.

Figure 6A:
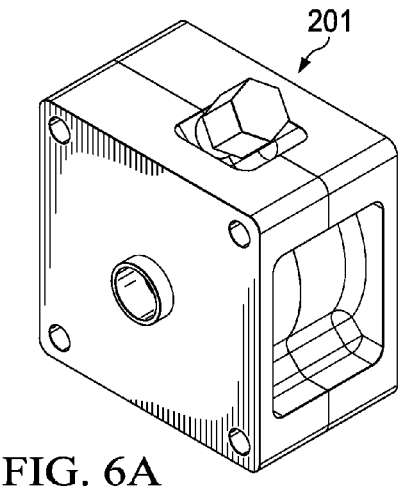
FIGS. 6A and 6B are respective perspective and exploded views of the preferred gearbox assembly of FIGS. 2A-2D and 3.

FIG. 6A shows a preferred embodiment of gear box assembly 201 shown in FIGS. 2A-2D and 3. An exploded view of the embodiment of FIG. 6A is shown in FIG. 6B. This embodiment uses a worm gear and a worm wheel to linearly extend and retract acme screw 301 of FIG. 3 in response to an applied rotational force.

As shown in FIG. 6B, gearbox assembly 201 includes a two-piece worm gearbox housing supporting a pair of bronze bushings 602, a pair of thrust washers 603, a worm wheel 604, and a bushing 605. The threads of acme screw 301 of FIG. 3 engage corresponding threads in the bore of worm wheel 604. Acme screw 301 rotates within bronze bushings 602 and thrust washers 603.

A worm gear 606 is disposed at an angle to worm wheel 604. The teeth of worm wheel 604 engage the helical groove of worm gear 606 such that worm wheel 604 rotates in response to rotation of worm gear 606. Worm gear 606 engages, and rotates in response to, a hexagonal drive shaft 608, which is supported by a pair of bronze bushings 607 and a cylindrical sleeve 609. Hexagonal drive shaft 608 rotates within bronze bushings 607. The hexagonal shape of drive shaft 608 allows a rotational force to be applied by a conventional hand tool (e.g., a ratchet and socket) or conventional field-operable power tool.

The rotational motion of worm wheel 604, worm gear 606, and drive shaft 608 is converted into linear motion by the helical groove of acme screw 301, such that acme screw 301 linearly travels through the threaded bore of worm wheel 604 and bronze bushings 607 through the sides of housing 601. Acme screw 301 in turn linearly retracts (pulls) or extends (pushes) broach 203, depending on the direction of rotation of drive shaft 608.

Figure 6C:
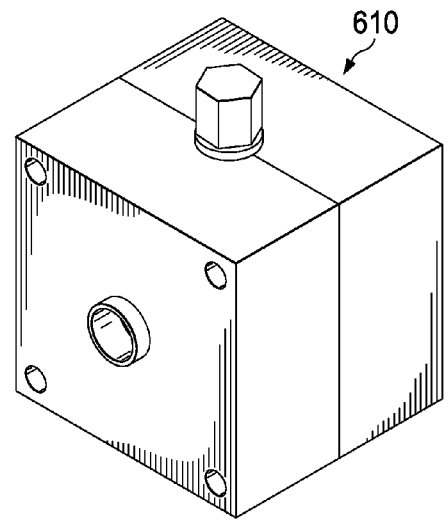
FIGS. 6C and 6D are respective perspective and exploded views of an alternate gearbox assembly suitable for use in the field-portable hole broaching machine of FIGS. 2A-2D and 3.
Figure 6E:
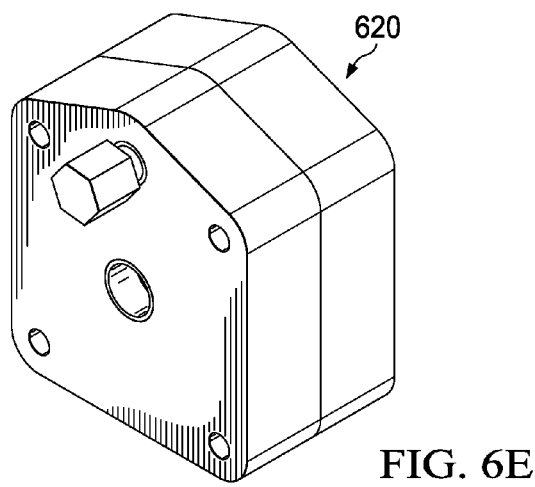
FIGS. 6E and 6F are respective perspective and exploded views of another alternate gearbox assembly suitable for use in the field-portable hole broaching machine of FIGS. 2A-2D and 3.
Figure 6B:
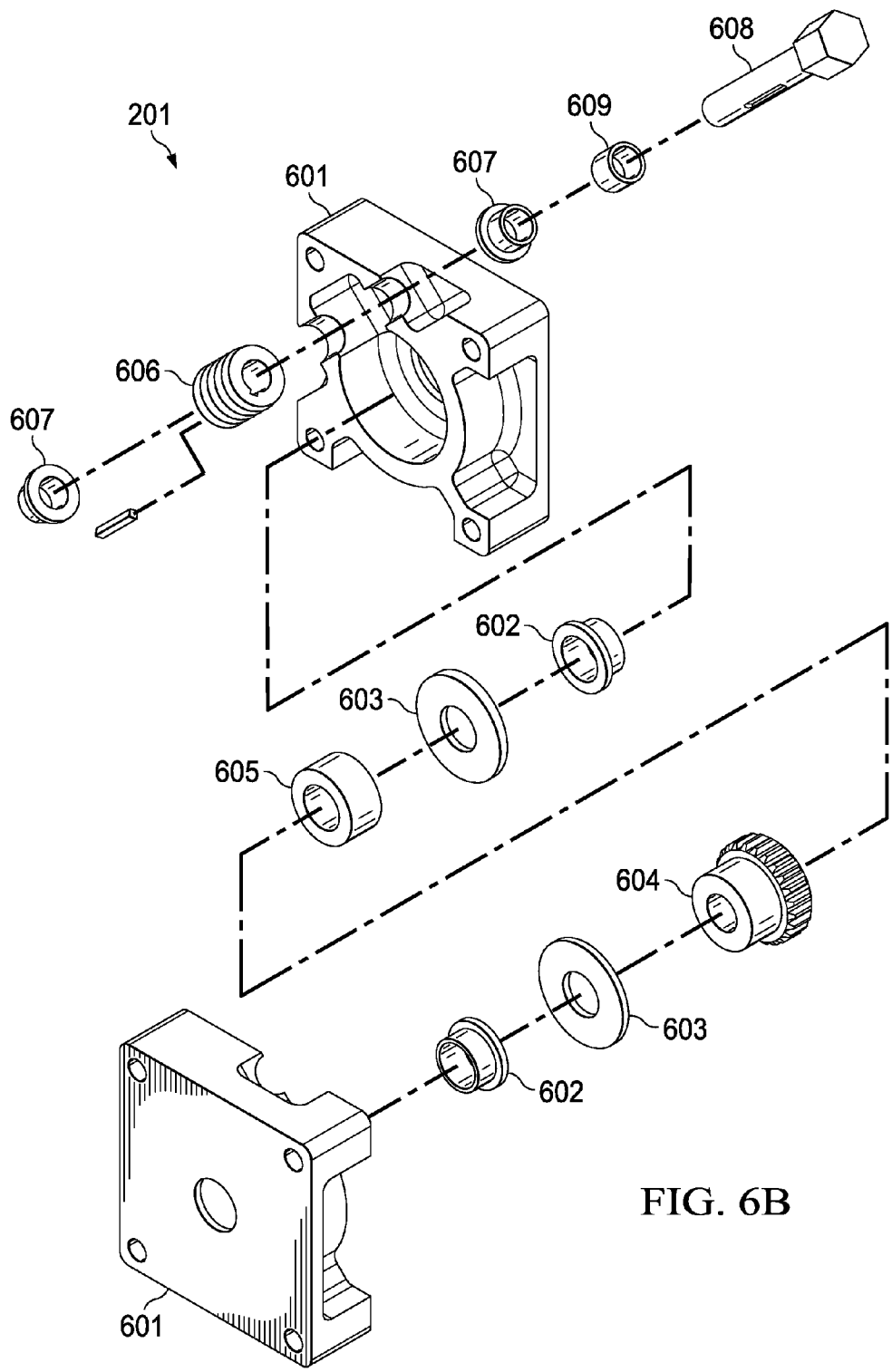
Figure 6D:
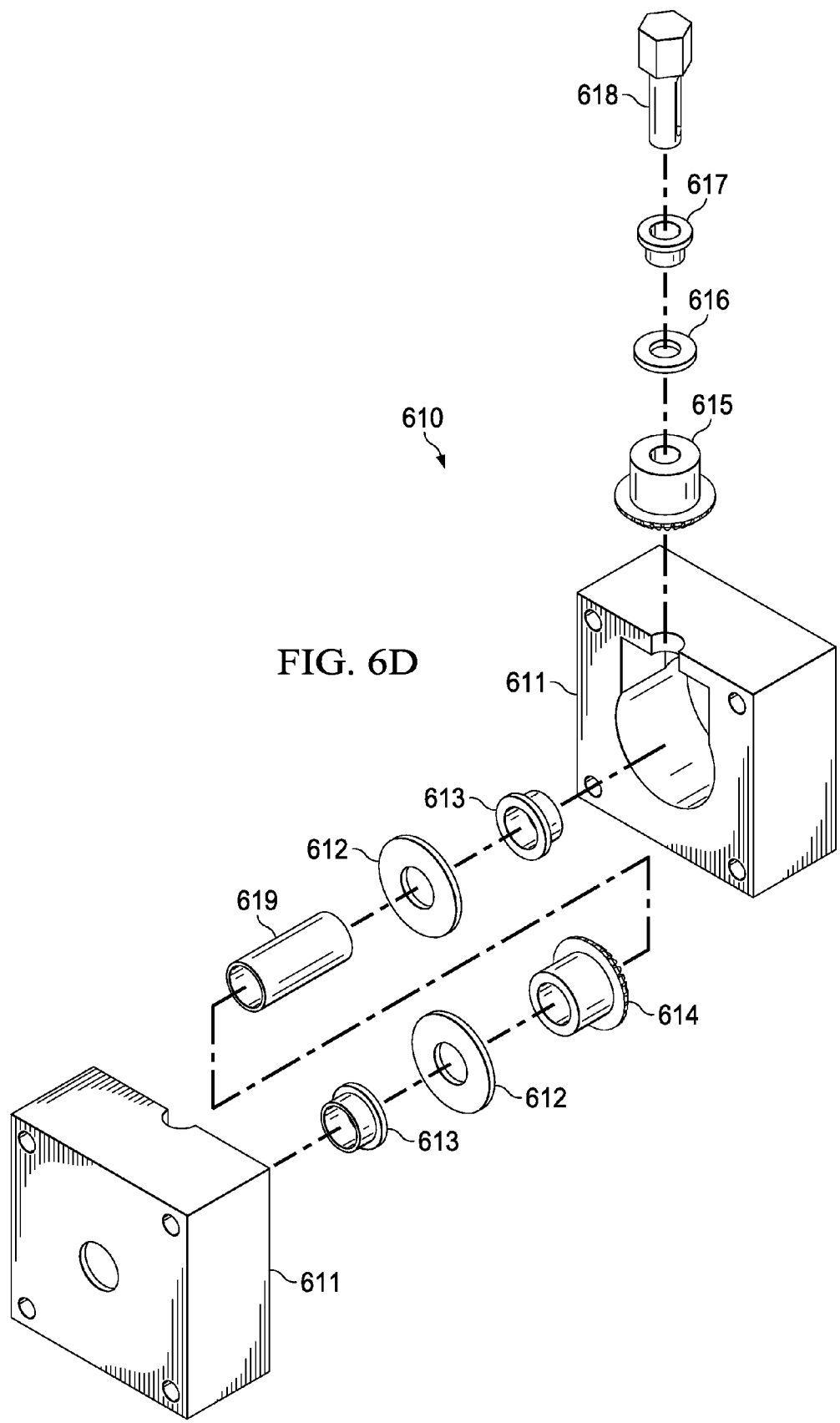

An alternate embodiment gearbox assembly 610 is shown in FIGS. 6C and 6D. This embodiment uses miter gears to impart linear motion to acme screw 301, in response to an applied rotational force.

Gearbox assembly 610 includes a two-piece housing 611 supporting a pair of thrust washers 612, bronze bushings 613, miter gear 614, and sleeve 619. Acme screw engages threads on the inner surface of miter gear 614 and linearly moves through thrust washers 613, bushings 613, and sleeve 619.

The teeth of miter gear 614 engage the teeth of a generally axially perpendicular miter gear 615. Miter gear 615, and in turn miter gear 614, rotate in response to rotational force applied to hexagonal drive shaft 618. Drive shaft 618 extends through a bronze bushing 617 supported by housing 611 and a thrust washer 616.

The rotation of miter gears 614 and 615 and drive shaft 618 is converted into linear motion by the helical grooves of acme screw 301, such that acme screw 301 linearly travels through the threaded bore of miter gear 614, thrust washers 612, bushings 613, and sleeve 619. In turn, acme screw 301 linearly retracts (pulls) or extends (pushes) broach 203, depending on the direction of rotation of drive shaft 618.

Figure 6F:
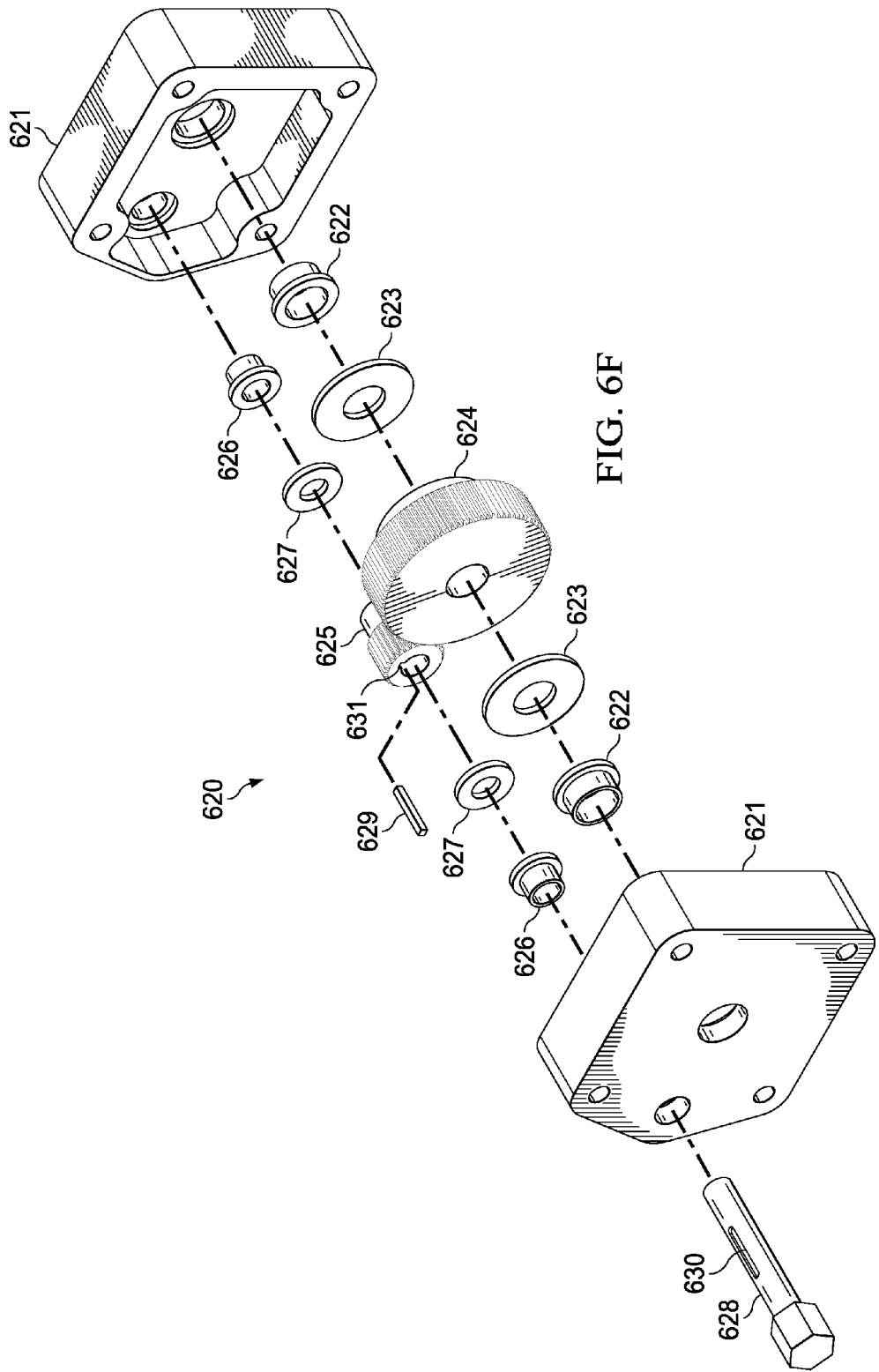

Another alternate gearbox assembly 620 is shown in FIGS. 6E and 6F. Alternate gearbox assembly 620 uses a pair of generally parallel gears to impart a linear motion to acme screw 301 in response to an applied rotational force.

Gearbox assembly 620 includes a two-piece housing 621 supporting parallel rotational mechanical couplings. Acme screw 301 extends through a first rotational mechanical coupling including a pair of bronze bushings 622, supported by corresponding apertures in housing 621, thrust washers 623, and three-inch gear 624. Threads in the bore of three-inch gear 624 engage the threads of acme screw 301.

A second rotational mechanical coupling includes a pair of bronze bushings 626, supported by corresponding apertures in housing 621, thrust washers 627, and one-inch gear 625. A hexagonal drive shaft 628 extends through bushings 626 and thrush washers 627, and engages one-inch gear 625. In particular, a key 629 engages a slot 630 on driveshaft 628 and a corresponding keyway 631 on one-inch gear 625 to rotationally lock one-inch gear 625 and drive shaft 628.

The teeth of one-inch gear 625 engage the teeth of 3-inch gear 624, such that rotational force applied to drive shaft 628 rotates both one-inch gear 625 and 3-inch gear 624. Depending on the direction of rotation of drive shaft 628, the helical groove of acme screw 301 translates the rotational motion into linear motion and acme screw 301 is pulled or pushed linearly through the threaded bore of three-inch gear 624, thrust washer 623, and bushings 622, which in turn linearly pulls or pushes broach pulling head assembly 304.

FIGS. 7A and 7B show the interrelationship between broach adapter plate 306, rail adapter plate 307, and rail shoe 310, which together form a quick release adapter assembly. As shown in FIG. 7A, broach adapter plate 306 has been aligned with rail adapter plate 307 and the release knobs 205 have been tightened firmly to connect broach adapter plate 306 to rail adapter plate 307, along with rail shoe 310. Also shown in FIG. 7A are 701 and 702, which are disposed on opposing sides of upper surface of rail adapter plate 307 in the assembly, for supporting the extensions of clamp block 318 (FIG. 5A) and allowing the upper surface 703 of rail adapter plate 307 to be received within clamp block receptacle 517 (FIG. 5A). A pair of threaded apertures 705 engage threaded fasteners 317 of FIG. 3.

FIG. 7B is an exploded view of the quick release adapter assembly shown in FIG. 7A. Alignment pin bushings 308 are supported in corresponding apertures on broach adapter plate 306 and align with corresponding alignment pins 704 on rail adapter plate 307 and allow pressure to be applied and released between the corresponding wings of broach adapter plate 306 and rail adapter plate 307. Adapter plate fasteners 305 thread into the threaded apertures of swivel pins 309 on the wings of rail adapter plate 307. Slots 316 in the wings of broach adapter plate 306 allow adapter plate fasteners 305 to swing into and out of engagement with broach adapter plate 306. Rail shoe 301 is attached to rail adapter plate 307 with conventional fasteners, which have not been shown for clarity.

A preferred application of the principles of the present invention is the forming of holes with precisely controlled diameters and smooth inner surfaces, in the web of a section of rail, as previously discussed. The process generally begins with the selection of a location on the rail web (e.g., the web of rail section 101 of FIGS. 1, 2A, 2C, and 3), which is away from welds or existing bolt holes.

The assembly including rail clamp assembly 206, rail adapter plate 307, and rail shoe 310 is placed at the selected location on rail section 101. At this point, broach adapter plate 306 and the remainder of the broaching machine (e.g., gear box assembly 201, broach tube assembly 202, broach 203) and the internal broach drive mechanism are not attached to rail section 101. Rail shoe 310 and clamp assembly 509 of rail clamp assembly 206 are clamped to opposing sides of the web rail by rotating rail clamp assembly screw handle 506, as shown in FIGS. 2A-2D.

A conventional rail drill (not shown), with a twist or spade bit, is mounted on an drill adapter plate similar to broach adapter plate 306. The drill and attached drill adapter plate are aligned and mated with rail adapter plate 307 and secured using adapter plate fasteners 305 and release knobs 205. After being secured to rail section 101, the drill is used to drill a pilot hole through the rail web. In the case of sensors 102a-102b, described above, the pilot hole is drilled with a drill bit having a nominal diameter of 9.8 to 9.9 mm. (In different hole forming operations, the drill bit may vary.)

After the pilot hole is drilled, release knobs 205 are loosened and adapter plate fasteners 305 and release knobs 205 are swung outward and the drill and its affixed adapter plate are separated from rail adapter plate 307. The assembly including rail clamp assembly 206, rail adapter plate 307, and rail shoe 310 remains attached to rail section 101.

Broach adapter plate 306 is then aligned and secured to rail adapter plate 306 in a similar fashion, along with the attached and gearbox assembly 201, broach tube assembly 202, broach 203, and the internal broach drive mechanism. After the user checks the position of puller head assembly 304, the user retracts puller head assembly 304 to the starting position adjacent the surface of broach adapter plate 306 by rotating hexagonal drive shaft 608 of gearbox assembly 601 in the proper rotational direction using a compatible hand- or power-driven tool. In particular, as drive shaft 608 rotates, acme screw 301 retracts puller head assembly 304 until surface 409 of puller head assembly 304 (FIG. 4D) contacts the surface of broach plate 306 around the periphery of aperture 320. When surface 409 puller head assembly 304 contacts the surface of broach adapter plate 306, broach sleeve 402 moves to the unlocked position against coil spring 407, thereby moving jaws 405 into alignment with recesses 410, which allows jaws 405 to have free radial motion within broach body 404 as discussed above in conjunction with FIGS. 4C and 4D.

Next, the user feeds end 401 of broach 203 through the pilot hole such that the broach cutting surfaces (i.e., chisel points) are correctly oriented. Broach 203 continues to be fed until broach end 401 is received within the bore of broach body 404 and between jaws 405. Drive shaft 208 of gearbox assembly 201 is then advanced slightly to move puller head assembly 304 away from the surface of broach adapter plate 306. Coil spring 407 applies an axial force to broach sleeve 407, which causes broach sleeve 402 to return to the locked position. As broach sleeve 402 moves into the locked position, broach jaws 405 move radially inward and engage locking notch 408 of broach 402.

Once broach 402 is locked into broach body 404, broach 402 is lubricated with cutting oil. Drive shaft 608 is again rotated to pull broach 402 until the first chisel point 406 is about to make contact with the rail material around the outer diameter of the pilot hole. Field broaching machine 200 is then given an overall check to ensure clear operation.

Once clear operation has been ensured, drive shaft 608 is continuously rotated to pull broach 402 through the pilot hole in rail section 101. This motion causes chisel points 406 to increase the hole diameter (e.g., to 10 mm) and smooth the hole inner surface. After broach 402 has been entirely pulled-through, release knobs 205 are loosened and adapter plate fasteners 305 and release knobs 205 are swung outward. The assembly including broach adapter plate 306, gearbox assembly 201, broach tube assembly 202, and broach 203 is separated from rail adapter plate 307.

Finally, the user cleans the hole of chips and debris and checks the hole diameter. If the hole diameter is satisfactory, the assembly including rail clamp assembly 206, rail adapter plate 307, and rail shoe 310 is unclamped from rail section 101 and removed.

The principles of the present invention advantageously provide for a portable broaching machine that is light and compact and particularly suitable for a range of field applications, including railroad field. Furthermore, since the broaching machine is entirely mechanical, the hydraulic actuators normally found in typical machines are eliminated, which allows the broaching machine to be actuated in the field either manually (e.g., with a ratchet and socket) or by conventional battery-powered portable tools. In addition, the alignment pins and corresponding alignment bushings on the quick disconnect adapter assembly ensure accurate hole creation.

For railroad applications, the winged configuration of the adapter plates allows for sufficient clearance from the track fasteners. Moreover, the preferred embodiments of the present invention use industry standard rail clamps and rail shoes.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A field-portable broaching machine comprising:
   a support structure configured to allow the field-broaching machine to be hand-carried in the field;
   a pulling head for releasably coupling to an end of a broach;
   an acme screw coupled to the pulling head for linearly moving the pulling head along a portion of the support structure;
   a gearbox assembly supported by the support structure and coupled to the acme screw for translating an applied rotational force into linear motion of the acme screw and the pulling head; and
   a first adapter plate supported by the support structure for mating with a compatible second adapter plate coupled to a railroad rail, the first adapter plate having an aperture therethrough allowing a broach coupled to the pulling head to linearly travel through a pilot hole formed through the railroad rail in response to the applied rotational force and linear motion of the acme screw and the pulling head.

2. The broaching machine of claim 1 wherein the pulling head comprises:
   a pulling head body including a bore for receiving the end of the broach;
   a plurality of jaws extending radially through the body and into the bore for clamping a portion of a shaft of the broach when in a locked position and releasing the shaft of the broach when in an unlocked position; and
   a sleeve concentric with the pulling head body and slidably disposed over the plurality of jaws for selectively setting the plurality of jaws into the locked and unlocked positions.

3. The broaching machine of claim 1, wherein the support structure comprises a tube having a wall defining an interior passageway through which the pulling head travels, a first end of the tube coupled to the gearbox assembly and a second end of the tube coupled to the first adapter plate, wherein the aperture through the first adapter plate is substantially concentric the interior passageway of the tube.

4. The broaching machine of claim 1, wherein the gearbox assembly comprises:
   a worm gear having a helical groove extending along an outer surface;
   a drive shaft coupled to the worm gear for rotating the worm gear in response to the applied rotational force; and
   a worm wheel having an outer surface with a plurality of radially extending teeth and a threaded bore for engaging threads on the acme screw, wherein the worm gear and the worm wheel translate the rotational force applied to the drive shaft into linear motion of the acme screw and the pulling head.

5. The broaching machine of claim 1, wherein the gearbox assembly comprises:
   a first miter gear having an outer surface with a plurality of radially extending teeth;
   a drive shaft coupled to first miter gear for rotating the first miter gear in response to the applied rotational force; and
   a second miter gear having a central axis disposed at an angle to a central axis of the first miter gear, an outer surface with a plurality of radially extending teeth for engaging the teeth of the first miter gear, and a threaded bore for engaging threads on the acme screw, wherein the first and second miter gears translate the rotational force applied to the drive shaft into linear motion of the acme screw and the pulling head.

6. The broaching machine of claim 1, wherein the gearbox assembly comprises:
   a first gear having an outer surface with a plurality of radially extending teeth;
   a drive shaft coupled to first gear for rotating the first gear in response to the applied rotational force; and
   a second gear having a central axis disposed in parallel to a central axis of the first gear, an outer surface with a plurality of radially extending teeth for engaging the teeth of the first gear, and a threaded bore for engaging threads on the acme screw, wherein the first and second gears translate the rotational force applied to the drive shaft into linear motion of the acme screw and the puling head.

7. The broaching machine of claim 6, wherein a diameter of the second gear is substantially greater than a diameter of the first gear.

8. A broaching system for forming holes through a web of a railroad rail comprising:
   a mounting and alignment system comprising:
      a rail shoe having an aperture and configured to engage a web of a railroad rail;
      a first adapter plate coupled to the rail shoe and having an aperture in substantial coaxial alignment with the rail shoe aperture; and
      a clamping assembly for clamping the rail shoe and the first adapter plate to the railroad rail; and
   a field-portable broaching machine comprising:
      a second adapter plate configured to engage with the first adapter plate, the second adapter plate having an aperture for substantial coaxial alignment with the first adapter plate aperture when the first and second adapter plates are engaged;
      a tube having a first end coupled to the second adapter plate and a wall defining an interior passageway substantially coaxially aligned with the aperture through the second adapter plate;
      a puller head for releasably coupling to an end of a broach and configured to travel along a portion of the interior passageway of the tube;
      an acme screw coupled to the puller head for linearly moving the puller head along a portion of the interior passageway of the tube; and
      a gearbox assembly coupled to a second end of the tube and the acme screw for translating an applied rotational force into linear motion of the acme crew and the puller head assembly such that a broach coupled to the puller head linearly travels through the apertures through the rail shoe and the first and second adapter plates and a pilot hole formed through the railroad rail.

9. The broaching system of claim 8, wherein the tube is cylindrical.

10. The broaching system of claim 8, further comprising at least one alignment pin disposed on a selected one of the first and second adapter plates and a corresponding alignment receptacle disposed on another one of the first and second adapter plates for aligning the first and second adapter plates for engagement.

11. The broaching system of claim 8, wherein;
   the first adapter plate includes first and second wings each including a swivel, each swivel supporting an end of a shaft of a fastening assembly; and
   the second adapter plate includes first and second wings each including a slot for engaging and releasing the shaft of a corresponding one of the fastening assemblies swiveling around a corresponding one of the swivels of the first adapter plate.

12. The broaching system of claim 8, wherein the gearbox assembly comprises a worm gear responsive to the applied rotational force and a worm wheel engaging with the worm gear and the acme screw for translating the applied rotational force into linear motion of the acme screw and the puller head.

13. The broaching system of claim 8, wherein the gearbox assembly comprises a first miter gear responsive to the applied rotational force and a second miter gear engaging with the first miter gear and the acme screw for translating the applied rotational force into linear motion of the acme screw and the puller head.

14. The broaching system of claim 8, wherein the gearbox assembly comprises a first gear rotating around a first axis and responsive to the applied rotational force and a second gear rotating around a second axis substantially parallel to the first axis and engaging the first gear and the acme screw for translating the applied rotational force into linear motion of the acme screw and the puller head.

15. The broaching system of claim 8, wherein the puller head comprises:
a coupling for coupling to the acme screw;
a body having a first portion received within a barrel of the coupling and a passageway for receiving an portion of a shaft of the broach;
a plurality of jaws ending radially through the body for clamping a portion of the shaft of the broach when in a locked position and allowing the portion of the shaft of the broach to slide within the passageway when in an unlocked position; and
a sleeve slidably disposed over a second portion of the body, the sleeve sliding into a first position for setting the plurality of jaws into the locked position and sliding into a second position for setting the plurality of jaws into the unlocked position.

16. The broaching system of claim 8, wherein the pulling head further comprises a spring coaxial with the sleeve for biasing the sleeve to the locked position.

17. A method of forming a hole through a web of a section of railroad rail comprising:
clamping a first adapter plate supported by a rail shoe to a selected portion of a section of railroad rail, an aperture of the first adapter plate being substantially in coaxial alignment with an aperture of the rail shoe;
drilling a pilot hole through a selected point on the second of rail, the pilot hole substantially in coaxial alignment with the apertures of the first adapter plate and the rail shoe;
mating the first adapter plate with a second adapter plate such that an aperture of the second adapter plate is substantially in coaxial alignment with the aperture of the first adapter plate, the second adapter plate supporting a broaching machine, the broaching machine including a lockable puller head for releasably receiving an end of a broach, an acme screw for linearly moving the pulling assembly, and a gearbox assembly for translating an applied rotational force into linear motion of the acme screw;
moving the pulling head assembly to a position proximate the pilot hole through the rail;
unlocking the pulling head for receiving the end of the broach;
inserting the end of the broach through the pilot hole and the apertures of the rail shoe and the first and second adapter plates and into engagement with the puller head;
locking the pulling head to retain the end of the broach; and
applying a rotational force to the gearbox assembly to pull a plurality of teeth on the broach through the pilot hole.

18. The method of claim 17, wherein drilling a pilot hole comprises:
clamping a third adapter supporting a drill to the first adapter plate; and
drilling the pilot hole through the apertures of the first adapter plate and the rail shoe.

19. The method of claim 17, wherein unlocking the puffing head comprises:
moving the pulling head assembly into contact with a surface of the second adapter plate such that a pressure-actuated unlocking mechanism of the pulling head unlocks the pulling head.

20. The method of claim 17, wherein locking the pulling head comprises:
moving the pulling head assembly away from contact with a surface of the second adapter plate such that a pressure-actuated locking mechanism of the pulling head locks the pulling head.

21. The method of claim 17, wherein applying a rotational force to the gearbox assembly comprises applying a manual force.

22. The method of claim 17, wherein applying a rotational force to the gearbox assembly comprises applying a force with a powered tool.

\* \* \* \* \*